United States Patent
Wrixon et al.

(10) Patent No.: US 10,002,225 B2
(45) Date of Patent: Jun. 19, 2018

(54) STATIC TIMING ANALYSIS WITH IMPROVED ACCURACY AND EFFICIENCY

(71) Applicant: Synopsys, Inc., Mountain View, CA (US)

(72) Inventors: Adrian Wrixon, Dublin (IE); Anton Belov, Dublin (IE); Maurice Keller, Dublin (IE); Richard Moloney, Dublin (IE); Himanshu Dadheech, Dublin (IE)

(73) Assignee: Synopsys, Inc., Mountain View, CA (US)

( * ) Notice: Subject to any disclaimer, the term of this patent is extended or adjusted under 35 U.S.C. 154(b) by 38 days.

(21) Appl. No.: 15/042,423

(22) Filed: Feb. 12, 2016

(65) Prior Publication Data
US 2017/0235868 A1    Aug. 17, 2017

(51) Int. Cl.
*G06F 17/50* (2006.01)

(52) U.S. Cl.
CPC ...... *G06F 17/5081* (2013.01); *G06F 17/5036* (2013.01)

(58) Field of Classification Search
CPC .................... G06F 17/5036; G06F 17/5081
See application file for complete search history.

(56) References Cited

U.S. PATENT DOCUMENTS

| | | | | |
|---|---|---|---|---|
| 6,708,139 B2* | 3/2004 | Rearick | .......... | G01R 31/318328 324/500 |
| 7,278,126 B2* | 10/2007 | Sun | ..................... | G06F 17/5031 716/114 |
| 7,797,601 B2* | 9/2010 | Kapur | .............. | G01R 31/31725 324/762.02 |
| 8,079,004 B2* | 12/2011 | Soviani | ............... | G06F 17/5045 703/16 |
| 8,117,577 B1* | 2/2012 | Vadi | .................... | G06F 17/5031 703/13 |
| 8,572,532 B1* | 10/2013 | Singh | ................... | G06F 17/505 716/107 |

(Continued)

OTHER PUBLICATIONS

Fuang et al.; "Implementation study of path-based AOCV model on pessimism reduction for 20nm technology"; Year: 2014; 2014 IEEE International Conference on Control System, Computing and Engineering (ICCSCE 2014); pp. 80-83.*

(Continued)

*Primary Examiner* — Helen Rossoshek
(74) *Attorney, Agent, or Firm* — Fenwick & West LLP (57) ABSTRACT

A method for performing static timing analysis of an integrated circuit design, wherein at least two timing paths share a shared node comprises propagating along the at least two timing paths a plurality of timing signals characterized by a set of timing parameters and determining respective values of the timing parameters at the shared node. Subsets of timing signals are defined based on relations between the determined parameter values of different timing signals. For each of the subsets representative parameter values are identified and a merged timing signal is propagated from the shared node at least partially along the at least two timing paths. Therein the merged timing signal has at the shared node the representative parameter values of the subset. The method also comprises generating timing data based on the merged timing signals and storing the timing data.

20 Claims, 2 Drawing Sheets

(56) References Cited

U.S. PATENT DOCUMENTS

| | | | | |
|---|---|---|---|---|
| 8,745,561 B1* | 6/2014 | Garg | ................... | G06F 17/5031 |
| | | | | 703/16 |
| 8,788,995 B1* | 7/2014 | Kumar | ................ | G06F 17/5031 |
| | | | | 716/110 |
| 8,839,167 B1* | 9/2014 | Dreibelbis | .......... | G06F 17/5031 |
| | | | | 716/108 |
| 8,863,052 B1* | 10/2014 | Dhuria | ................ | G06F 17/5036 |
| | | | | 716/108 |
| 9,589,096 B1* | 3/2017 | Gupta | ................. | G06F 17/5081 |
| 2010/0287517 A1* | 11/2010 | Buss | ..................... | H03G 7/007 |
| | | | | 716/113 |
| 2015/0331981 A1* | 11/2015 | Mulvaney | ........... | G06F 17/5031 |
| | | | | 716/134 |
| 2016/0070844 A1* | 3/2016 | Shyamsukha | ....... | G06F 17/5081 |
| | | | | 716/113 |
| 2016/0364505 A1* | 12/2016 | Kim | ..................... | G06F 17/505 |

OTHER PUBLICATIONS

Blaauw, D., et al., "Slope Propagation in Static Timing Analysis," Computer Aided Design, ICCAD-2000, IEEE/ACM International Conference on Nov. 5-9, 2000, pp. 338-343.

Lee, J-F., et al., "On the signal bounding problem in Timing analysis," Computer Aided Design, ICCAD-2001, IEEE/ACM International Conference on Nov. 4-8, 2001, pp. 507-514.

* cited by examiner

STATIC TIMING ANALYSIS WITH IMPROVED ACCURACY AND EFFICIENCY

BACKGROUND OF THE INVENTION

The invention relates to static timing analysis (STA) in particular to STA with improved accuracy, in particular improved accuracy with respect to graph-based static timing analysis (GBA), and improved efficiency, in particular improved efficiency with respect to path-based static timing analysis (PBA).

Current integrated circuit, IC, designs, may include an extremely large number of cells such as logic gates and synchronous or sequential devices connected by interconnects. The synchronous or sequential devices include flip-flops and latches.

STA, for example, in the course of electronic design automation (EDA) is tasked with analyzing a circuit design to determine if timing constraints are met, for example whether all timing signals arrive at constrained cells or interconnects of the circuit design within a respective required time. The difference between arrival and required time may be measured as slack, wherein a negative slack means an arrival time of the respective timing signal violates the respective required time and may lead to unstable circuit behavior. Designers may have to ensure that there are no violating or negative slacks in the design in order to sign-off the design.

GBA may determine slack values with linear complexity in the size of the circuit. GBA may combine information from different timing paths which may lead to overestimation of delays and hence a pessimistic slack. This may unfortunately lead to an overestimation in the number of violating paths in the circuit design.

PBA may analyze each timing path in isolation. Unfortunately, analyzing all timing paths is a problem of exponential complexity in the size of the circuit. Thus, performing PBA on an entire circuit may be infeasible for large circuits due to a large runtime and/or memory overhead.

SUMMARY OF THE INVENTION

The present disclosure provides an improved concept with reduced pessimism and consequently improved accuracy compared to GBA and with reduced runtime and consequently improved efficiency compared to PBA.

Embodiments enable increased accuracy compared to GBA by propagating a greater number of timing signals over a graph of the circuit design which may provide a conservative bounding of arrival times but without the large accuracy sacrifice that GBA incurs. For a shared node of two or more timing paths it is determined which subsets of timing signals converging at the shared node are merged together in order to keep the analysis memory and/or runtime overhead tractable but minimize a loss in accuracy. Therein, merging may be understood as discriminating timing signals of different subsets but not timing signals of the same subset. This mechanism allows for improved accuracy of slack and/or arrival time computation compared to GBA with reduced runtime compared to PBA.

According to the improved concept, a method for performing STA of an integrated circuit design having a set of timing paths, wherein at least two timing paths of the set of timing paths share a shared node is provided. The method comprises propagating along the at least two timing paths a plurality of timing signals being characterized at least in part by a set of timing parameters and determining respective values of the timing parameters for each of the plurality of timing signals at the shared node.

The method further comprises defining one or more subsets of timing signals of the plurality of timing signals based on relations between the determined parameter values of different timing signals comprised by the plurality of timing signals. The method comprises for each of the one or more subsets identifying representative parameter values from the determined parameter values of that subset, in particular of the timing signals comprised by that subset, and for each of the one or more subsets propagating a merged timing signal from the shared node at least partially along the at least two timing paths. Therein, for each of the one or more subsets the merged timing signal has, in particular is defined by having, at the shared node the representative parameter values of that subset. The method also comprises generating timing data based on the merged timing signals of the one or more subsets and storing the timing data.

Each of the plurality of timing signals carries values of the set of timing parameters varying for different nodes of the at least two timing paths. Propagating a timing signal along a timing path corresponds to sequentially computing or updating values of the set of timing parameters for the nodes of that timing path.

According to some embodiments, the shared node corresponds to a point of convergence between the at least two timing paths. The point of convergence may be any circuit pin of a cell comprised by all of the at least two timing paths. Correspondingly, the timing signals comprised by the plurality of timing signals correspond to convergent timing signals converging at the shared node.

According to some embodiments, the defining of the one or more subsets is performed based on a degree of similarity of the determined parameter values of the timing signals of the plurality of timing signals.

According to some embodiments, the method further comprises weighting the determined parameter values, in particular before defining the one or more subsets. The relations between the determined parameter values of the different timing signals may comprise or consist of relations of differences between the weighted parameter values of the different timing signals.

The weighting is for example performed according to an influence, sensitivity or impact of the respective timing parameter of the set of timing parameters on an arrival time or slack value, in particular on an arrival time or slack value of a timing signal at the shared node and/or on an arrival time or slack value at a node corresponding to an endpoint of one or more of the at least two timing paths.

An arrival time of a timing signal corresponds to a time the timing signal needs to be propagated from a reference node, in particular a start node, of the corresponding timing path to the node at which the arrival time is considered, for example the shared node. In particular, the arrival time may correspond to a sum of delays associated to interconnects and cells lying between the start node and the node at which the arrival time is considered, for example the shared node. It is pointed out that the arrival time is not necessarily zero at the reference node and may have an offset value at the reference node. The offset value may for example depend on a timing of a clock signal.

The slack value corresponds to a difference between the arrival time and a corresponding required time. Depending on a type of constraint, may be computed such that a violation is always represented by a negative slack. The required time corresponds to a limiting time for the arrival time to ensure stable circuit behavior and may for example depend on a timing of a clock signal.

A timing signal may be represented in a multidimensional parameter space spanned by the set of timing parameters, in particular the weighted set of timing parameters, by a point in the multidimensional parameter space corresponding to the determined parameter values, in particular to the weighted parameter values, of that timing signal at the shared node. The relations or differences between the weighted parameter values of the different timing signals may correspond to relations or differences between the weighted parameter values of the different timing signals in the multidimensional parameter space.

According to some embodiments, the set of timing parameters comprises an arrival time at the shared node.

According to some embodiments, the one or more subsets may consist of timing signals of the plurality of timing signals lying within close proximity to each other or being clustered in the multidimensional parameter space. Therein, which timing signals are to be considered "lying within close proximity" or "being clustered" may be defined for example by means of defining a maximum size of a bounding box in the multidimensional parameter space containing all points corresponding to the timing signal of the subset.

According to some embodiments, the timing signals comprised by one of the one or more subsets correspond to points in the multidimensional parameter space lying within a bounding box.

The bounding box may for example be a multidimensional manifold in the multidimensional parameter space such as for example a cuboid, a multidimensional cuboid, a multidimensional orthotope, a multidimensional hyperrectangle, a multidimensional box, a sphere, a multidimensional sphere, a multidimensional hypersphere an ellipsoid, a multidimensional ellipsoid.

According to some embodiments, a total number of the one or more subsets is given by a maximum number, in particular a predefined maximum number, of allowed signals for shared node.

The maximum number of allowed signals may for example be varied to achieve optimal accuracy versus runtime and/or capacity tradeoff.

According to some embodiments, the method further comprises varying the maximum number of allowed signals to adjust a timing accuracy and/or a runtime requirement and/or a memory requirement of the static timing analysis. In particular, the timing accuracy may be traded for the runtime requirement and/or the memory requirement by varying the maximum number of allowed signals.

According to some embodiments, the definition of the one or more subsets corresponds to a minimization of sizes of the bounding boxes of the one or more subsets, in particular under the condition that the total number of the one or more subsets is given by the maximum number of allowed signals for the shared node.

The size of the bounding boxes may be for example one of the following: a volume or multidimensional volume of the bounding box, a linear size of the bounding box, a diagonal length of the bounding box.

According to some embodiments, the definition of the one or more subsets corresponds to maximizing an accuracy, in particular a timing accuracy, in particular a timing accuracy at the shared node and/or at one or more further nodes comprised by one or more of the at least two timing paths.

The timing accuracy may for example correspond to the sizes of the bounding boxes of the one or more subsets. In particular, larger sizes of the bounding boxes may correspond to less accuracy and smaller sizes of the bounding boxes may correspond to greater accuracy.

According to some embodiments, the definition of the one or more subsets is performed based on a clustering algorithm adapted for clustering, in particular proximity-based clustering, the timing signals of the plurality of timing signals depending on their respective determined parameter values, in particular their respective weighted parameter values, at the shared node.

According to some embodiments, the clustering of the timing signals of the plurality of timing signals by the clustering algorithm is based on a constrained optimization of a timing accuracy at the shared node performed in the multidimensional parameter space spanned by the set of timing parameters, in particular by the set of weighted timing parameters.

The constraint may comprise or may be given by the total number of the one or more subsets being equal to the maximum number of allowed signals at the shared node.

According to some embodiments, the method comprises for each of the one or more subsets generating the merged timing signal, the merged timing signal being characterized by the set of timing parameters, wherein values of the timing parameters of the merged timing signal at the shared node are given by the representative parameter values of that subset. The method further comprises for each of the one or more subsets initiating the merged timing signal at the shared node for propagating the merged timing signal at least partially along the at least two timing paths.

For each of the one or more subsets, the respective merged timing signal is an artificial signal in the sense that it is not necessarily equal to one of the timing signals comprised by that subset. However, it is possible that one timing signal of the timing signals of a subset may dominate, all the other timing signals of that subset and then the merged signal may for example be equal to that dominant signal.

According to some embodiments, each of the parameters of the set of timing parameters has an impact on an arrival time, in particular on an arrival time at the shared node and/or on an arrival time at a node corresponding to an endpoint of one or more of the at least two timing paths. That os, if for a given timing signal characterized by the set of timing parameters one of the timing parameters of the set of timing parameters is varied, an arrival time of the timing signal, in particular the arrival time of the timing signal at the shared node and/or on an arrival time at the node corresponding to the endpoint, is changed.

According to some embodiments, for each of the one or more subsets the identification of the representative parameter values corresponds to a most pessimistic choice from the determined parameter values of the timing signals comprised by that subset. Therein, pessimistic refers to pessimistic regarding arrival times of the merged signals at the shared node and/or at the node corresponding to the endpoint and/or at one or more further nodes comprised by one or more of the at least two timing paths.

In particular, compared to all other possible choices of parameter values from the determined parameter values of that subset, the representative parameter values of that subset are most pessimistic with respect to the arrival time of the merged signal of that subset at the shared node and/or at the node corresponding to the endpoint.

Therein, more pessimistic may for example correspond to a greater difference between the arrival time and the respective required time, in particular a greater absolute value of the difference between the arrival time and the respective required time.

According to some embodiments, the method further comprises storing the timing data to a non-transitory computer-readable storage medium for example for further use by other algorithms for example PBA.

According to some embodiments, the timing data is used as a basis for engineering change order, ECO, modifying and/or adapting the circuit design, a netlist of the circuit design and/or a physical implementation scheme of the design.

According to some embodiments, the timing data is used as a basis for releasing or partially releasing the circuit design, a netlist of the circuit design and/or a physical implementation scheme of the design.

According to some embodiments, the timing data is used as a basis for performing PBA for example performing PBA on a number of timing paths that are found to violate a timing constraint by means of a method according to the improved concept.

According to some embodiments, the method further comprises computing an arrival time for each of the merged signals of the one or more subsets at one or more further nodes comprised by one or more of the at least two timing paths.

According to some embodiments, the stored timing data include the computed arrival times or timing paths depending on the computed arrival times.

According to some embodiments, the timing data is used to generate a timing report. The timing report contains for example information about whether or not timing constraints are met for one or more of the at least two timing paths. The timing report may further comprise indications regarding registers, pins and/or cells being comprised by a timing path that violates a timing constraint.

According to some embodiments, for each of the one or more subsets the identification of the representative parameter values comprises identifying a respective representative parameter value for each of the set of timing parameters independently.

Consequently, the identification of the representative parameter values does not necessarily correspond to selecting one of the timing signals comprised by the subset, for example a dominant one of the timing signals with respect to pessimism.

According to some embodiments, for each of the one or more subsets the representative parameter values of that subset may comprise at least one of the determined parameter values of a first timing signal comprised by that subset and at least one of the determined parameter values of a second timing signal comprised by that subset.

According to some embodiments, the set of timing parameters comprises at least one parameter depending on at least one of the following: an arrival time, a signal slew, an on-chip variation analysis metrics, a measure for signal integrity, an arrival window, a signal waveform. The set of timing parameters may contain parameters depending on other timing parameters than mentioned in that list.

According to some embodiments, each of the at least two timing paths may comprise: a) a respective clock segment extending from a clock source of the circuit design to a respective launching device and/or to a respective capturing device in the design and/or b) a respective data segment extending between a respective launching device of the circuit design and a respective capturing device of the circuit design.

According to some embodiments, the at least two timing paths may not comprise a physical capturing device and/or may not comprise a physical launching device.

Also for such timing paths, respective timing constraints may be defined. In particular, a capturing device and/or launching device in one of the at least two timing paths is not a necessary prerequisite for the application of a method according to the improved concept.

According to the improved concept, also a computer-program product is provided. The computer-product comprises a computer-readable storage medium, in particular a tangible and non-transitory computer-readable storage medium, and a computer program module. The computer program module is stored in the computer-readable storage medium and contains instructions for STA of an integrated circuit design having a set of timing paths, wherein at least two timing paths of the set of timing paths share a shared node. The computer program module is configured to be executed by a processor. When the computer program module is being executed by said processor, the instructions cause the processor to execute a process comprising steps, in particular all steps, of a method for performing STA according to the improved concept described herein.

According to some embodiments of the computer-program product, when the computer program module is being executed by said processor, the instructions cause the processor to execute a process comprising propagating along the at least two timing paths a plurality of timing signals being characterized at least in part by a set of timing parameters and determining respective values of the timing parameters for each of the plurality of timing signals at the shared node.

The process further comprises defining one or more subsets of timing signals of the plurality of timing signals based on relations between the determined parameter values of different timing signals comprised by the plurality of timing signals. The process comprises for each of the one or more subsets identifying representative parameter values from the determined parameter values of that subset, in particular of the timing signals comprised by that subset, and for each of the one or more subsets propagating a merged timing signal from the shared node at least partially along the at least two timing paths. Therein, for each of the one or more subsets the merged timing signal has, in particular is defined by having, at the shared node the representative parameter values of that subset. The process also comprises generating timing data based on the merged timing signals and storing the timing data.

According to some embodiments of the computer-program product, the computer program module is comprised by an electronic design automation, EDA, software and/or an EDA tool.

Further embodiments of the computer-program product are readily derived by any person skilled in the art from the various embodiments of the method and vice versa.

Embodiments also relate to a computer system. The computer system comprises a processor, a memory and a computer program module, the computer program module being stored in the memory and containing instructions for STA of an integrated circuit design having a set of timing paths, wherein at least two timing paths of the set of timing paths share a shared node. The processor is configured to execute the computer program module, wherein when the computer program module is being executed by the processor, the instructions cause the processor to execute a process comprising steps, in particular all steps, of a method for performing STA according to the improved concept described herein.

According to some embodiments of the computer system, when the computer program module is being executed by said processor, the instructions cause the processor to execute a process comprising propagating along the at least two timing paths a plurality of timing signals being characterized at least in part by a set of timing parameters and determining respective values of the timing parameters for each of the plurality of timing signals at the shared node.

The process further comprises defining one or more subsets of timing signals of the plurality of timing signals based on relations between the determined parameter values of different timing signals comprised by the plurality of timing signals. The process comprises for each of the one or more subsets identifying representative parameter values from the determined parameter values of that subset, in particular of the timing signals comprised by that subset, and for each of the one or more subsets propagating a merged timing signal from the shared node at least partially along the at least two timing paths. Therein, for each of the one or more subsets the merged timing signal has, in particular is defined by having, at the shared node the representative parameter values of that subset. The process also comprises generating timing data based on the merged timing signals and storing the timing data.

Further embodiments of the computer system are readily derived by any person skilled in the art from the various embodiments and embodiments of the method and/or the computer-program product and vice versa.

DETAILED DESCRIPTION

Figure 1:
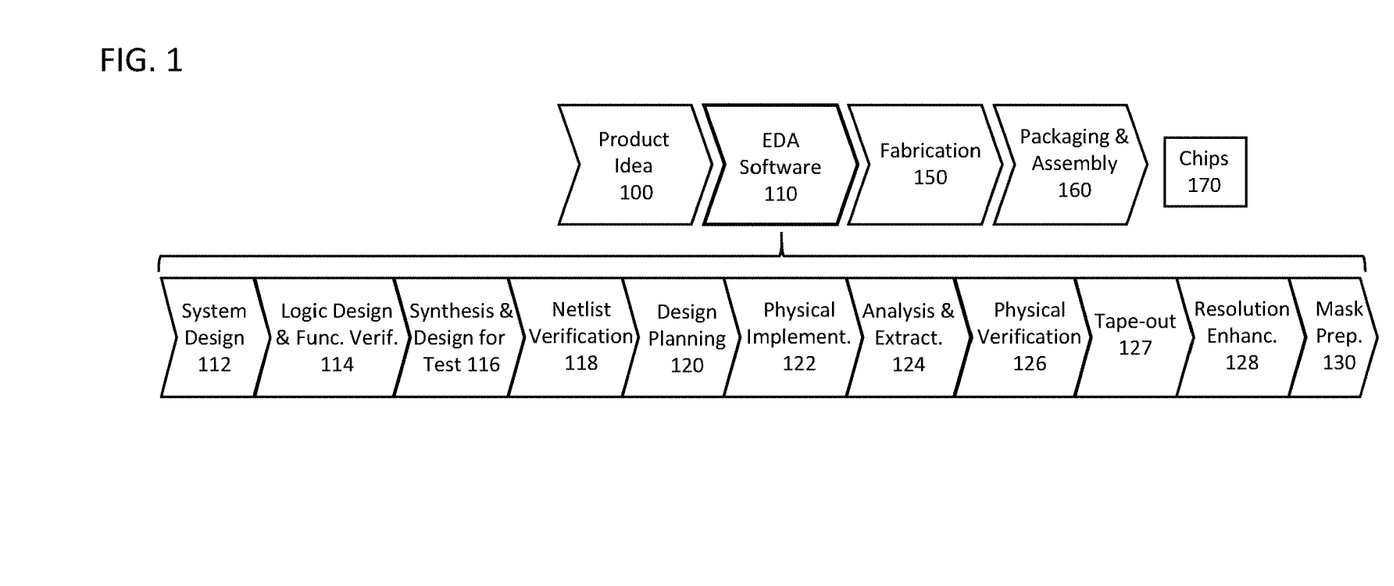
FIG. 1 shows a simplified representation of an illustrative integrated circuit design flow.

FIG. 1 shows a simplified representation of an illustrative design flow for designing an electronic circuit in particular an integrated circuit (IC). An implementation of a method according to the improved concept may for example be embedded within such design flow. However, an implementation of a method according to the improved concept may also be utilized within another design flow or independently from a design flow.

At a high level, the process starts with the product idea (step 100) and is realized in an electronic design automation (EDA) software design process (step 110). When the design is finalized, it can be taped-out (step 127). At some point after tape-out, the fabrication process (step 150) and packaging and assembly processes (step 160) occur, resulting ultimately in finished IC chips (result 170).

The EDA software design process (step 110) itself is composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) is provided.

System design (step 112): Designers describe functionalities they want to implement. They may perform what-if planning to refine functionality, check costs, etc. Hardware-software architecture partitioning may be carried out at this stage.

Logic design and functional verification (step 114): At this stage, a VHDL, SystemVerilog or Verilog code for modules in the system is written and the design is checked for functional accuracy. More specifically, the design is checked to ensure that it produces correct outputs in response to particular input stimuli.

Synthesis and design for test (step 116): Here, the VHDL/Verilog code is translated to a netlist. The netlist can be optimized for the target technology. Additionally, the design and implementation of tests to permit checking of the finished chip occurs.

Netlist verification (step 118): At this step, the netlist is checked for compliance with timing constraints and for correspondence with the VHDL/Verilog source code. Aspects of the invention, for example a method according to the improved concept, may be performed during this step 118.

Design planning (step 120): Here, an overall floorplan for the chip is constructed and analyzed for timing and top-level routing. Aspects of the invention, for example a method according to the improved concept, may be performed during this step 120.

Physical implementation (step 122): The placement (positioning of circuit elements) and routing (connection of the same) is carried out in this step (place-and-route process).

Analysis and extraction (step 124): In this step, the circuit function is verified at a transistor level, in turn permitting what-if refinement. Aspects of the invention, for example a method according to the improved concept, may be performed during this step 124.

Physical verification (step 126): At this step various checking functions are performed to ensure correctness for: manufacturing, electrical issues, lithographic issues, and circuitry.

Tape-out (step 127): This step provides the "tape-out" data to be used (after lithographic enhancements are applied if appropriate) for production of masks for lithographic use to produce finished chips.

Resolution enhancement (step 128): This step involves geometric manipulations of the layout to improve manufacturability of the design. This step for example includes optical proximity correction (OPC).

Mask data preparation (step 130): This step provides mask-making-ready "tape-out" data for production of masks for lithographic use to produce finished chips. Often this step includes partitioning or fracturing non-rectangular shaped islands into rectangles.

As mentioned, aspects of the invention may be performed during netlist verification (step 118), design planning (step 120) and/or during analysis and extraction (step 124). However, it may also be suitable to perform aspects of the invention during other steps of the EDA process or during steps of another circuit design process.

Figure 2:
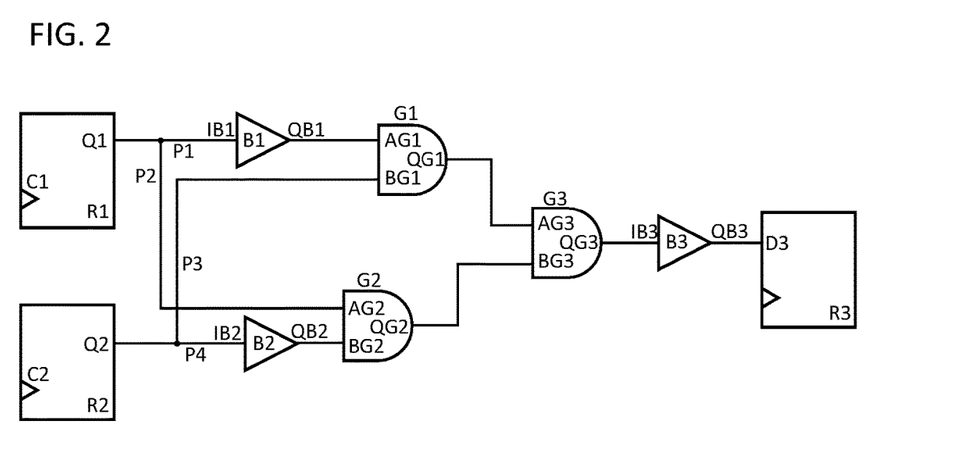
FIG. 2 shows an exemplary part of an integrated circuit design, according to one embodiment.

FIGS. 2 shows an exemplary part of an integrated circuit design and aspects of an exemplary implementation of a method according to the improved concept. The circuit design of FIG. 2 is chosen for exemplary reasons only. A method according to the improved concept may analogously be applied to different circuit designs.

The circuit design comprises a first register R1, a second register R2 and a third register R3. Each of the registers R1, R2, R3 comprises for example a flip-flop and/or a latch. The circuit design further comprises a first buffer B1 with an input IB1 connected to an output Q1 of the first register R1 and a second buffer B2 with an input IB2 connected to an output Q2 of the second register R2. The circuit design comprises a first logic gate G1 with a first input AG1 connected to an output QB1 of the first buffer B1 and with a second input BG1 connected to the output Q2 of the second register R2. The circuit design comprises a second logic gate G2 with a first input AG2 connected to the output Q1 of the first register R1 and with a second input BG2 connected to an output QB2 of the second buffer B2.

The circuit design further comprises a third logic gate G3 with a first input AG3 connected to an output QG1 of the first logic gate G1 and with a second input BG3 connected to an output QG2 of the second logic gate G2. The circuit design also comprises a third buffer B3 with an input IB3 connected to an output QG3 of the third logic gate G3 and with an output QB3 connected to a data input D3 of third register R3.

For clarity, the clock circuitry has been omitted from the diagram. Consequently, the part of the circuit design shown in FIG. 2 depicts a first timing path P1, in particular a data segment of the first timing path P1, including for example a clock input C1 of the first register R1, the output Q1 of the first register R1, the input IB1 and output QB1 of the first buffer B1, the first input AG1 and the output QG1 of the first logic gate G1, the first input AG3 and the output QG3 of the third logic gate G3, the input IB3 and output QB3 of the third buffer B3 and the data input D3 of the third register R3. A second timing path P2, in particular a data segment of the second timing path P2, includes for example the clock input C1 of the first register R1, the output Q1 of the first register R1, the first input AG2 and the output QG2 of the second logic gate G2, the second input BG3 and the output QG3 of the third logic gate G3, the input IB3 and output QB3 of the third buffer B3 and the data input D3 of the third register R3.

A third timing path P3, in particular a data segment of the third timing path P3, includes for example a clock input C2 of the second register R2, the output Q2 of the second register R2, the second input BG1 and the output QG1 of the first logic gate G1, the first input AG3 and the output QG3 of the third logic gate G3, the input IB3 and output QB3 of the third buffer B3 and the data input D3 of the third register R3. A fourth timing path P4, in particular a data segment of the fourth timing path P4, includes for example the clock input C2 of the second register R2, the output Q2 of the second register R2, the input IB2 and the output QB2 of the second buffer B2, the second input BG2 and the output QG2 of the second logic gate G2, the second input BG3 and the output QG3 of the third logic gate G3, the input IB3 and output QB3 of the third buffer B3 and the data input D3 of the third register R3.

The first register R1 acts as a launching device of the first and the second timing path P1, P2 and the second register R2 acts as a launching device of the third and the fourth timing path P3, P4. The third register R3 acts as a capturing device for the timing paths P1, P2, P3, P4. The data input D3 of the third register R3 may be considered as an endpoint of each of the timing paths P1, P2, P3, P4. The output QG1 of the first logic gate G1 represents a first shared node or point of convergence of the first and the third timing path P1, P3. The output QG2 of the second logic gate G2 represents a second shared node or point of convergence of the second and the fourth timing path P2, P4. The output QG3 of the third logic gate G3 represents a third shared node or point of convergence of the first, the second, the third and the fourth timing path P1, P2, P3, P4.

For performing STA, timing signals may be initiated at the clock inputs C1, C2 of the first and the second register R1, R2 and propagated along the timing path P1, P2, P3, P4 until the data input D3 of the third register R3. For the explanations in the following, only two timing parameters, for example an arrival time and signal slew, are considered. However, in general each timing signal may have a plurality of timing parameters, in particular more than two timing parameters.

The slew corresponds for example to an average rate of change of output voltage per unit of time of a signal. In the following, a first slew value s1 is assumed for signals originating from the first register R1 and a second slew value s2 is assumed for signals originating from the second register R2, wherein the first slew value s1 may for example be greater than the second slew value s2. The arrival time represents a time elapsed for a signal to arrive at a certain point of the circuit design. As references, is in the following assumed that the arrival time is zero at the clock inputs C1, C2 of the first and the second register R1, R2. However, this choice is not to be considered limiting nor obligatory. Any other reference could be chosen analogously.

The arrival time of timing signals propagating along a timing path is updated for example by adding respective delay values associated to the cells or interconnects of the circuit design comprised by that timing path. In the following, it is without imposing any limitations assumed for example that interconnects cause zero delay and that also zero delay is caused by the registers R1, R2 between the clock input C1 and the output Q1 as well as between the clock input C2 and the output Q2. It is further assumed that the buffers B1, B2, B3 cause a delay of 2 in arbitrary time units for signals having the first slew value s1 and a delay of 4 in the arbitrary time units for signals having the second slew value s2. It is further assumed that the logic gates G1, G2, G3 cause a delay of 5 in the arbitrary time units for signals having the first slew value s1 and a delay of 10 in the arbitrary time units for signals having the second slew value s2.

Consequently, according to PBA, a timing signal propagating along the first timing path P1 has the first slew value s1 and the following arrival times: 0 at IB1, 2 at AG1, 7 at AG3, 12 at IB3 and 14 at D3. According to PBA, a timing signal propagating along the second timing path P2 has the first slew value s1 and the following arrival times: 0 at AG2, 5 at BG3, 10 at IB3 and 12 at D3. According to PBA, a timing signal propagating along the third timing path P3 has the second slew value s2 and the following arrival times: 0 at BG1, 10 at AG3, 20 at IB3 and 24 at D3. According to PBA, a timing signal propagating along the fourth timing path P4 has the second slew value s2 and the following arrival times: 0 at IB2, 4 at BG2, 14 at BG3, 24 at IB3 and 28 at D3. It follows that the arrival time at the endpoints of the timing paths P1, P2, P3, P4 is according to PBA 14 for P1, 12 for P2, 24 for P3 and 28 for P4.

According to GBA, timing signals are for example merged at every shared node for example when some basic compatibility criteria of the timing signals are met. The timing parameters of the merged timing signal correspond to a most pessimistic choice with respect to arrival time. The arrival times at the endpoint of the timing paths are then computed based on delays computed for the merged signals. Depending on a type of timing constraints under consideration, a larger arrival time or a smaller arrival time may be more pessimistic. In the following it is assumed that a larger arrival time corresponds to the more pessimistic choice. The explanations may be readily adapted to the opposite case. It follows that according to GBA, a merged signal with slew s2 and arrival time 10 is generated at the output QG1 of the first logic gate G1 and a merged signal with slew s2 and arrival time 14 is generated at the output QG2 of the second logic gate G2. Correspondingly, a merged signal with slew s2 and arrival time 24 is generated at the output QG3 of the second logic gate G3. Thus, the arrival time at the endpoints of the timing paths P1, P2, P3, P4 is according to GBA 21 for P1, 19 for P2, 24 for P3 and 28 for P4. In particular, the GBA arrival times are larger than the PBA arrival times at the endpoints of timing paths P1 and P2.

According to the improved concept, timing signals are not necessarily merged at each shared node. Rather, timing signals may for example only be merged if a specified maximum number of allowed signals is exceeded at a respective shared node. For example, for the explanations in the following, it is assumed that the maximum number of allowed signals is equal to two at the shared nodes corresponding to the outputs QG1, QG2, QG3 of the logic gates G1, G2, G3. For example, two timing signals corresponding to the first and the third timing path P1, P3 are present at the first shared node QG1 and two timing signals corresponding to the second and the fourth timing path P2, P4 are present at the second shared node QG2. Consequently, no merging of signals may be performed at the first and the second shared node QG1, QG2 conserving PBA accuracy at these shared nodes.

Furthermore, four timing signals corresponding to the first, second, third and the fourth timing path P1, P2, P3, P4 may be present at the third shared node QG3. Consequently, merging is performed at the third shared node QG3 according to the improved concept. As follows from the explanations with respect to PBA above, at the third shared node QG3 a first timing signal corresponding to the first timing path P1 has signal slew s1 and arrival time 12, a second timing signal corresponding to the second timing path P2 has signal slew s1 and arrival time 10, a third timing signal corresponding to the third timing path P3 has signal slew s2 and arrival time 20 and a fourth timing signal corresponding to the fourth timing path P4 has signal slew s2 and arrival time 24.

According to the improved concept, for example two subsets of timing signals are defined depending on differences in slew and/or arrival time at the third shared node QG3 as two is the exemplary maximum allowed number of signals at the third shared node QG3. In particular, timing signals with similar slew and/or arrival time at the third shared node QG3 may be within the same subset. In the present example, a first subset is for example formed by the first timing signal with slew s1 and arrival time 12 and the second timing signal with slew s1 and arrival time 10. A second subset is for example formed by the third timing signal with slew s2 and arrival time 20 and the second timing signal with slew s2 and arrival time 24.

It is pointed out that the definition of the subsets may in general be based on weighted timing parameters such as a weighted slew and/or weighted arrival time. The weighting is for example performed based on the impact of the respective timing parameter on the arrival time, in particular on the arrival time at the endpoint of the respective timing path of the timing signal being considered. The definition of the subsets is then for example performed by means of a clustering algorithm, in particular a proximity-based clustering algorithm, based on the relations or differences of the timing parameters, in particular weighted timing parameters, of the timing signals at the third shared node QG3.

Then, for example a merged timing signal is generated for each of the subsets. The merged timing signals of the subsets may have as timing parameters for example the most pessimistic timing parameters of the signals of the respective subset. For the present example, greater arrival time and smaller slew are considered more pessimistic compared to smaller arrival time and greater slew, respectively. The method is readily adapted to the opposite case. Consequently, a merged timing signal of the first subset has for example slew s1 and arrival time 12 at the third shared node QG3, while a merged timing signal of the second subset has for example slew s2 and arrival time 24 at the third shared node QG3. The arrival times at the endpoint of the timing paths are then computed based on delays with respect to the merged signals of the first and the second subset.

Consequently, according to the improved concept, a timing signal propagating along the first timing path P1 has the first slew value s1 and the following arrival times: 0 at IB1, 2 at AG1 and 7 at AG3. A timing signal propagating along the second timing path P2 has the first slew value s1 and the following arrival times: 0 at AG2 and 5 at BG3. A timing signal propagating along the third timing path P3 has the second slew value s2 and the following arrival times: 0 at BG1 and 10 at AG3. A timing signal propagating along the fourth timing path P4 has the second slew value s2 and the following arrival times: 0 at IB2, 4 at BG2 and 14 at BG3.

From the third shared node QG3 onwards, the merged signals of the first and the second subsets are propagated. The merged signal of the first subset has slew s1 and the following arrival times: 12 at QG3 and 14 at D2. The merged signal of the second subset has slew s2 and the following arrival times: 24 at QG3 and 28 at D2.

Thus, the arrival time at the endpoints of the timing paths P1, P2, P3, P4 is according to the improved concept 14 for P1, 12 for P2, 24 for P3 and 28 for P4. In particular, the arrival times according to the improved concept are less pessimistic than the GBA arrival times at the endpoints of timing paths P1 and P2. In the present example, less pessimistic arrival times may for example correspond to smaller arrival times, depending on a type of constraint. That means, according timing accuracy is improved with respect to GBA. In the described example, timing accuracy is in fact equal to PBA timing accuracy. In addition, according to the improved concept, complexity and computing time is reduced compared to PBA due to the described merging of timing signals of the first and second subset at the third shared node QG3.

Figure 3A:
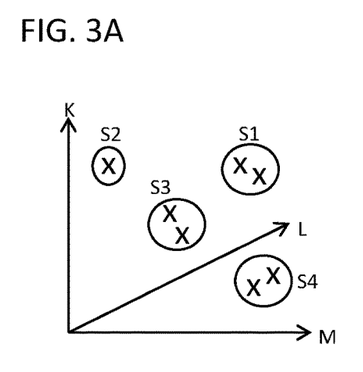
FIGS. 3A and 3B show a multidimensional parameter space, according ton one embodiment.
Figure 3B:
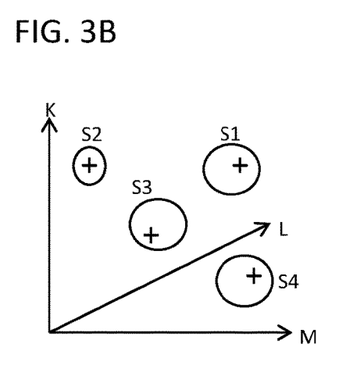

FIGS. 3A and 3B show a multidimensional parameter space and further aspects of an exemplary implementation of a method according to the improved concept.

In the course of the description with respect to FIG. 2 two timing parameters, namely arrival time and signal slew, have been considered. In general, however, each timing signal may be characterized by more than two timing parameters including but not limited to for example the arrival time, the signal slew, an on-chip variation analysis, OCVA, metrics such as an OCVA depth value and/or an OCVA distance value, a measure for signal integrity, an arrival window and/or a signal waveform.

Consequently, in general the definition of the subsets and the merging of the signals at a shared node according to the improved concept may be visualized in a multidimensional parameter space of timing parameters. In FIGS. 3A and 3B, an example for three timing parameters is chosen for reasons of presentability. The explanations may be readily generalized to higher dimensional parameter spaces for the case of more than three timing parameters.

FIG. 3A shows a parameter space spanned by timing parameters K, L and M. Each of the parameters K, L and M may correspond to one of the timing parameters listed above or a weighted version of one of the timing parameters listed above. The weighting may for example be carried out based on an impact of the respective timing parameter on an arrival time, in particular an arrival time at an end point of the considered timing paths.

In FIG. 3A, each cross "X" represents a timing signal at a shared node or point of convergence of at least two timing paths, wherein the timing signal is represented by the parameters or weighted parameters K, L and M of that timing signal at the shared node. For example a proximity-based clustering algorithm is used to determine which of the timing signals lie in close proximity to each other in the multidimensional parameter space spanned for example by K, L and M. A result of the clustering algorithm is for example a definition of subsets, in the shown example four subsets S1, S2, S3, S4, of the timing signals at the shared node.

Then, according to the improved concept, a merged timing signal is generated or defined for each of the subsets S1, S2, S3, S4. This is visualized in FIG. 3B. Each cross "+" in FIG. 3B corresponds to a merged timing signal of the respective one of the subsets S1, S2, S3, S4. Therein, the parameters of weighted parameters K, L, M of the merged timing signals correspond for example to a worst-case or most pessimistic choice of the timing parameters of the timing signals of the respective subset S1, S2, S3, S4, wherein worst-case or most pessimistic refers to the impact on the arrival time, in particular the arrival time at a respective endpoint of the timing path. It is pointed out that the values of the parameters K, L, M of a merged signal are not necessarily equal to the values of the parameters K, L, M of a single one of the timing signals of the respective subset. Rather, the values of the parameters K, L, M of the merged signal may correspond to the values of the parameters K, L, M of different timing signals within the respective subset.

For example the value of K of a merged signal may correspond to the value of K of a first timing signal of the respective subset, the value of L of the merged signal may correspond to the value of L of a second timing signal of the respective subset and the value of M of the merged signal may correspond to the value of M of the first, the second or a third timing signal of the respective subset. The merged signals of the subsets are then propagated along the timing path starting from the shared node for example for the delay calculation of interconnects and/or cells of the circuit design. Arrival times at the endpoints of the timing path are then computed based on the merged timing signals.

Figure 4:
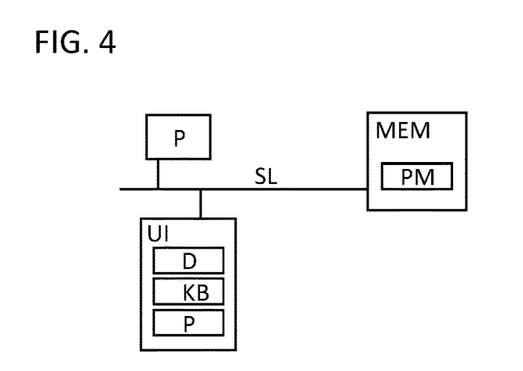
FIG. 4 shows a block diagram of a computer system, according to one embodiment.

FIG. 4 shows a schematic block diagram of an exemplary implementation of a computer system according to the improved concept. The computer system comprises at least one processor P connected to one or more signal lines SL. The signal lines SL may for example constitute a communication bus. The computer system also comprises a user interface UI connected to the one or more signal lines SL, the user interface UI comprising for example a display D, a keyboard KB and/or a pointer device P such as a mouse.

The computer system also comprises a computer-readable memory MEM connected to the one or more signal lines. The memory MEM may for example comprise a computer program module PM. The computer program module PM contains for example instructions for STA of an integrated circuit design according to the improved concept as explained and described above. In particular, the processor P is configured to execute the computer program module PM and when the computer program module PM is being executed by the processor P, the instructions cause the processor P to execute a process comprising steps, in particular all steps, of a method for performing STA of an integrated circuit design according to the improved concept described herein.

In modern deep submicron designs, an accuracy gap between GBA and PBA has increased and many STA users may consider PBA for signoff. GBA may be considered as too pessimistic and relying on it may result in overdesign and/or compromises to other design parameters such as area or power.

According to the disclosure, an improved concept allowing for STA with improved timing accuracy, in particular compared to GBA, and with reduced runtime requirements, in particular compared to PBA, is provided. By modifying for example the maximum number of allowed timing signals at a shared node, a tunable tradeoff between accuracy improvement and runtime improvement may be available.

To deal with the accuracy gap designers may use GBA in an optional first step to pessimistically identify all the violating paths in the design and then subject them to STA according to the improved concept in a second step to reduce the number of violating paths. In an optional third step, PBA may be used on the violating paths remaining after the second step to further reduce the number of violating paths.

According to the improved concept, merging of timing signals may consider all signal parameters that impact slack or arrival time such as arrival time itself, slew, on-chip variation metrics, arrival window, and so forth. Each of these parameters may be weighted based on the sensitivity of signal slack or arrival time to the parameter, where the weighting may be non-linear and based for example on analytical and/or empirical foundations. Convergent signals are then for example opportunistically merged according to an objective function that may minimize accuracy loss, which corresponds for example to proximity-based clustering in the parameter space. Each cluster or subset corresponds to a merged signal to be differentiated and propagated onwards from the shared node. The merged signal is for example formed by worst-casing the parameters of signals in the subset. Since a merged signal may cover paths with similar properties the accuracy loss due to merging is minimized. The number of merged signals is therefore under direct control, which may be leveraged to dynamically trade performance against accuracy as the analysis progresses.

We claim:

1. A method for performing static timing analysis of an integrated circuit design, the method comprising:
   receiving, by a computer processor, a circuit design for an integrated circuit, the circuit design comprising a set of timing paths, wherein at least two timing paths of the set of timing paths share a node, and wherein a timing path is associated with one or more of a register, a pin, or a cell of the integrated circuit;
   propagating, by the computer processor, along the at least two timing paths a plurality of timing signals being characterized at least in part by a set of timing parameters;
   determining, by the computer processor, respective values of the timing parameters for each of the plurality of timing signals at the shared node;
   defining, by the computer processor, one or more subsets of timing signals of the plurality of timing signals based on relations between the determined parameter values of different timing signals comprised by the plurality of timing signals;

for each of the one or more subsets identifying, by the computer processor, representative parameter values from the determined parameter values of that sub set;

for each of the one or more subsets propagating, by the computer processor, a merged timing signal from the shared node at least partially along the at least two timing paths, the merged timing signal having at the shared node the representative parameter values of that subset; and generating, by the computer processor, timing data based on the merged timing signals, wherein the timing data is used in at least one of (1) further design and (2) manufacture of the integrated circuit.

2. The method of claim 1, wherein each of the parameters of the set of timing parameters has an impact on an arrival time.

3. The method of claim 1, wherein the identification of the representative parameter values corresponds to a most pessimistic choice from the determined parameter values regarding arrival times of the merged signals at the shared node and/or at one or more further nodes comprised by one or more of the at least two timing paths.

4. The method of claim 1, wherein a total number of the one or more subsets is given by a predefined maximum number of allowed signals for the shared node.

5. The method of claim 4 further comprising varying the predefined maximum number of allowed signals to adjust a timing accuracy and/or a runtime requirement and/or a memory requirement of the static timing analysis.

6. The method of claim 1, wherein the definition of the one or more subsets maximizes a timing accuracy at the shared node and/or at one or more further nodes comprised by one or more of the at least two timing paths.

7. The method of claim 1, wherein the method further comprises weighting the determined parameter values; and the relations between the determined parameter values of the different timing signals comprise relations or differences between the weighted parameter values of the different timing signals.

8. The method of claim 1, wherein the definition of the one or more subsets is performed based on a clustering algorithm adapted to cluster timing signals of the plurality of timing signals depending on their respective determined parameter values at the shared node.

9. The method of claim 8, wherein the clustering of the timing signals of the plurality of timing signals by the clustering algorithm is based on a constrained optimization of a timing accuracy at the shared node performed in a multidimensional parameter space spanned by the set of timing parameters.

10. The method of claim 1, further comprising computing an arrival time for each of the merged signals at one or more further nodes comprised by one or more of the at least two timing paths.

11. The method of claim 10, wherein the stored timing data include the computed arrival times or timing values depending on the computed arrival times.

12. The method of claim 1, wherein the identification of the representative parameter values comprises identifying a respective representative parameter value for each of the set of timing parameters independently.

13. The method of claim 1, wherein for each of the one or more subsets the representative parameter values of that subset comprise at least one of the determined parameter values of a first timing signal comprised by that subset and at least one of the determined parameter values of a second timing signal comprised by that subset.

14. The method of claim 1, wherein the set of timing parameters comprises at least one parameter depending on at least one of the following: an arrival time, a signal slew, an on-chip variation analysis metrics, a measure for signal integrity, an arrival window, a signal waveform.

15. The method of claim 1, wherein the shared node corresponds to a point of convergence between the at least two timing paths.

16. The method of claim 1, wherein each of the at least two timing paths comprises:

a respective clock segment extending from a clock source of the circuit design to a respective launching device of the circuit design and/or to a respective capturing device of the circuit design; and/or a respective data segment extending between a respective launching device of the circuit design and a respective capturing device of the circuit design.

17. The method of claim 1 further comprising storing the timing data to a non-transitory computer-readable storage medium.

18. A non-transitory computer-readable storage storing instructions thereon, the instructions when executed by a processor cause the processor to perform static timing analysis of an integrated circuit design, the instructions causing the processor to:

receive, by a computer processor, a circuit design for an integrated circuit, the circuit design comprising a set of timing paths, wherein at least two timing paths of the set of timing paths share a node, and wherein a timing path is associated with one or more of a register, a pin, or a cell of the integrated circuit propagate, by the computer processor, along the at least two timing paths a plurality of timing signals being characterized at least in part by a set of timing parameters;

determine, by the computer processor, respective values of the timing parameters for each of the plurality of timing signals at the shared node;

define, by the computer processor, one or more subsets of timing signals of the plurality of timing signals based on relations between the determined parameter values of different timing signals comprised by the plurality of timing signals;

for each of the one or more subsets identify, by the computer processor, representative parameter values from the determined parameter values of that subset;

for each of the one or more subsets propagate, by the computer processor, a merged timing signal from the shared node at least partially along the at least two timing paths, the merged timing signal being characterized at the shared node by the representative parameter values of that subset; and generate, by the computer processor, timing data based on the merged timing signals, wherein the timing data is used in at least one of (1) further design and (2) manufacture of the integrated circuit.

19. The computer-readable storage medium of claim 18, wherein the instructions further cause the processor to store the timing data to the memory or to a non-transient computer-readable storage medium.

20. A computer system comprising a memory and a computer program module stored in the memory and containing instructions for static timing analysis of an integrated circuit design, and a processor configured to execute the computer program module, wherein when the computer program module is being executed by the processor the instructions cause the processor to execute a process comprising:
  receiving, by a computer processor, a circuit design for an integrated circuit, the circuit design comprising a set of timing paths, wherein at least two timing paths of the set of timing paths share a node, and wherein a timing path is associated with one or more of a register, a pin, or a cell of the integrated circuit
  propagating, by the computer processor, along the at least two timing paths a plurality of timing signals being characterized at least in part by a set of timing parameters;
  determining, by the computer processor, respective values of the timing parameters for each of the plurality of timing signals at the shared node;
  defining, by the computer processor, one or more subsets of timing signals of the plurality of timing signals based on relations between the determined parameter values of different timing signals comprised by the plurality of timing signals;
  for each of the one or more subsets identifying, by the computer processor, representative parameter values from the determined parameter values of that subset;
  for each of the one or more subsets propagating, by the computer processor, a merged timing signal from the shared node at least partially along the at least two timing paths, the merged timing signal being characterized at the shared node by the representative parameter values of that subset; and
  generating, by the computer processor, timing data based on the merged timing signals, wherein the timing data is for used in at least one of (1) further design and (2) manufacture of the integrated circuit.

* * * * *